Patented Feb. 6, 1951

2,540,129

UNITED STATES PATENT OFFICE 2,540,129

SEPARATION OF IRON FROM HYDROCARBONS

George G. Lauer, New York, and Robert S. Pratt, Valley Stream, N. Y., assignors to The M. W. Kellogg Company, Jersey City, N. J., a corporation of Delaware No Drawing. Application October 31, 1947, Serial No. 783,450

4 Claims. (Cl. 196—44)

This invention relates, generally, to the separation of iron from mixtures containing dissolved iron and one or more hydrocarbons. In one aspect, this invention relates to a method for separating iron from mixtures containing dissolved iron and one or more hydrocarbons obtained in the catalytic hydrogenation of oxides of carbon. More particularly in this aspect, the invention relates to an improved method for separating iron from mixtures containing iron as a dissolved impurity and one or more hydrocarbons, wherein such mixtures comprise a hydrocarbon-rich phase obtained in the catalytic hydrogenation of oxides of carbon.

In the hydrogenation of oxides of carbon in the presence of a catalyst at elevated temperatures, a reaction product is obtained in the vapor state as reactor outlet gases at temperatures varying between about 300° F. and about 700° F. and containing hydrocarbons, water vapor, and oxygenated organic compounds which comprise fatty acids, alcohols, ketones, esters, and aldehydes. These gases may be passed through one or more condensation zones in which they are cooled to temperatures within the range from about 40° F. to about 150° F. The resulting condensate then separates into an aqueous phase and an oil or hydrocarbon-rich phase. Both phases contain saturated and unsaturated hydrocarbons in admixture with oxygenated organic compounds, higher molecular weight compounds tending to remain in the oil or non-aqueous liquid phase while compounds of lower molecular weight tend to remain in the aqueous phase.

Dissolved iron, in the form of a sludge has been found to be present in the aforementioned oil phase, formed for the most part by the action of the synthesis reaction product upon the reaction vessel and/or by contamination with iron-containing catalysts employed in carrying out the hydrogenation step. Various methods have heretofore been practiced for removing dissolved iron impurities from hydrocarbons or mixtures of hydrocarbons. Among these methods are those which embody treating such hydrocarbons with strong mineral acids to react with iron, and subsequently separating the resulting iron salts by conventional methods. Such procedures, however, have been found to result in hydrocarbon decomposition; and in instances where oxygenated organic compounds may be also present in the aforementioned mixtures, there is a tendency for these oxygenated compounds to react with the acid treating agent, thus affecting their subsequent recovery in a state of unchanged composition. Other methods embody treating the aforementioned iron-containing hydrocarbon mixtures with varying concentrations of alkali treating agents. Such methods also have been found to be undesirable, inasmuch as they are limited to only a partial recovery of the iron. This result is encountered where a sufficient amount of alkali treating agent is used to neutralize the free organic acids which may be present in such iron-containing hydrocarbon mixtures and it is desired to remove iron as the oxide or hydroxide. Where such quantities of alkali treating agent are employed, there is a tendency of the alkali to promote undesirable side-reactions such as condensation and/or polymerization of carbonyl compounds (such as aldehydes and ketones), unsaturated products, and materials with polyfunctional groups. Such action is more apt to occur in the presence of alkali treating agents than in the presence of mineral acids, when the latter are used as treating agents. Still other methods for removing dissolved iron impurities in admixture with hydrocarbons have been attempted in the past. For example, distillation by conventional methods has proved undesirable, by reason of hydrocarbon decomposition caused by the application of heat. Similarly, molecular distillation has been shown to be ineffective in separating iron impurities from the aforementioned mixtures.

It is, therefore, an object of the present invention to provide an improved method for the separation of iron from mixtures containing dissolved iron and one or more hydrocarbons.

Another object of the invention is to provide an improved method for the separation of iron from mixtures containing dissolved iron and one or more hydrocarbons obtained in the catalytic hydrogenation of oxides of carbon at elevated temperatures.

Still another object of the invention is to provide an improved method for the separation of iron from mixtures containing dissolved iron and one or more hydrocarbons wherein such mixtures comprise a hydrocarbon-rich phase obtained in the catalytic hydrogenation of oxides of carbon at elevated temperatures.

Other objects and advantages inherent in the invention will be apparent from the following more detailed disclosure.

We have found that dissolved iron impurities, present in varying concentrations, may be separated from the aforementioned hydrocarbon mixtures by treating these mixtures with aqueous solutions of sodium bisulfite under conditions such that a ferruginous sulfite, comprising ferric and/or ferrous sulfite, is produced as a product of the reaction, and effecting separation of the latter to obtain iron-free hydrocarbons. In treating these mixtures to liberate iron impurities, we have found that aqueous solutions of sodium bisulfite may be employed over wide ranges of concentrations, although we prefer to employ aqueous solutions comprising between about 1% and about 40% by weight of sodium bisulfite, to effect ionization of sodium bisulfite to such a degree that reactions with substantially all iron impurities present, may be obtained. It should be noted, however, that the degree of sodium bisulfite dilution is not critical, provided sufficient quantities of the bisulfite ion are present to effect complete reaction with all iron present, to form a ferruginous sulfite, comprising ferric and/or ferrous sulfite, as a relatively heavy lower-aqueous phase upon effecting subsequent phase separation. Excess quantities of sodium bisulfite and/or water will also be present in this phase. Iron-free hydrocarbons will comprise a relatively light upper phase. The phases may be subsequently separated by any of the conventional means known to those skilled in the art. We have also found that the contact time required in effecting complete reaction between dissolved iron and the aqueous sodium bisulfite treating agent is not critical and need be only of sufficient duration, effective to obtain the desired reaction. Using aqueous sodium bisulfite solutions as treating agents in the preferred range of concentrations between about 1% and about 40% by weight, we have found that such contact time may vary from about one minute to about five minutes depending upon the particular concentration and volume of sodium bisulfite used and upon the intimacy of contact between phases. In this respect, it should be noted that it may be desirable in some instances to effect the iron extraction batchwise with aqueous sodium bisulfite. In such instances the contact time required for each individual treatment, the sum total of which will effect complete removal of iron from hydrocarbons, may be proportionately reduced.

As indicated above, the reaction mixture obtained by adding aqueous sodium bisulfite to the iron-containing hydrocarbon or hydrocarbon mixtures, is further subjected to phase separation, in order to obtain the resulting ferruginous sulfite, comprising ferric and/or ferrous sulfite, as a lower aqueous phase, and iron-free hydrocarbons as an upper phase. In this respect, it should be noted that any conventional means of phase separation may be practiced, although we particularly prefer any form of agitation in which the products of the reaction may be resolved into the above-mentioned two phases. Such agitation of the reaction mixture may be practiced as, for example, simple stirring, centrifuging, pumping, or any combination of steps which will resolve the aforementioned reaction mixture into two phases. The phases thus formed may then be separated by any conventional means to obtain the hydrocarbon or mixture of hydrocarbons, iron-free.

The following specific example will serve to illustrate, but is not intended in any way to limit the present invention.

Two liters of a mixture comprising $C_4$ and higher hydrocarbons and water-insoluble oxygenated organic compounds in minor amounts, were obtained by water-washing the aforementioned oil or hydrocarbon phase obtained as a product in the catalytic hydrogenation of carbon monoxide at an elevated temperature. This mixture upon analysis was found to contain, in addition to the aforementioned hydrocarbons and water-insoluble oxygenated compounds, 0.152% iron as $Fe_2O_3$ by weight. The mixture was next shaken in a separatory funnel for five minutes with 400 ml. (20% of the volume of the oil) of a 5% (by weight) aqueous sodium bisulfite solution. Following agitation, the mixture was allowed to separate into two layers. The lower aqueous phase was withdrawn. This phase was found to comprise ferric sulfite and water. From the remaining upper hydrocarbon phase, 150 ml. of solution were withdrawn and analyzed for iron. The remainder of the solution was next subjected to a series of treatments in which the above procedure was repeated. In each instance a 5% (by weight) aqueous sodium bisulfite in an amount equivalent to 20% of the volume of the oil treated was employed. Following each treatment 150 ml. of solution were withdrawn and analyzed for iron. The results obtained are shown in the table.

*Table*

| Treatment No. | Weight Per Cent $NaHSO_3$ [1] | Per Cent Iron (as $Fe_2O_3$) |
| --- | --- | --- |
| Untreated Oil: | | 0.152 |
| 1 | 5 | 0.13 |
| 2 | 5 | 0.08 |
| 3 | 5 | 0.003 |
| 4 | 5 | 0.002 |
| 5 | 5 | |

[1] ⅕ by volume of oil treated.

From the table, it will be seen that approximately 98.7% of iron (as $Fe_2O_3$) present in the original mixture was removed after the fifth treatment. Accordingly, it was found that by increasing either the concentration of the aqueous sodium bisulfite treating agent, or by increasing the ratio of the volume of bisulfite solution used per volume of oil treated, correspondingly greater quantities of iron impurities could be removed, resulting in a corresponding reduction in the number of treatments required in effecting substantially complete removal of iron. Hence, by treating the aforementioned hydrocarbon mixture with an aqueous solution of sodium bisulfite having a concentration of approximately 40%, in an oil:bisulfite solution ratio of 5:3 and a contact time of approximately 5 minutes, substantially all iron impurities may be removed from the aforementioned hydrocarbon mixtures, in one treatment.

To recapitulate, this invention is directed to an improved method for separating iron from mixtures containing iron as a dissolved impurity and one or more hydrocarbons, wherein such mixtures comprise a hydrocarbon-rich phase obtained in the catalytic hydrogenation of oxides of carbon. However, while the invention has been described as having a particular applicability to the separation of iron impurities from hydrocarbon mixtures obtained from the source indicated, it should be noted that the process of the invention is not necessarily restricted to effect the desired iron separation from hydrocarbons as derived from the aforementioned source. The process of the invention may be also successfully applied to the separation of iron impurities from any mixtures of the aforementioned hydrocarbons without regard to the source from which these mixtures may have been derived.

Having thus described our invention what we claim and desire to secure by Letters Patent is:

1. A method for separating iron from a mixture containing same, a hydrocarbon and a carbonyl which comprises treating said mixture with an aqueous solution comprising between about 1% and about 40% by weight of sodium bisulfite whereby a ferruginous sulfite is produced without reacting said carbonyl, and separating said ferruginous sulfite from said hydrocarbon and carbonyl.

2. A method for separating iron from a mixture containing same, a hydrocarbon and a carbonyl which comprises treating said mixture with an aqueous solution comprising between about 1% and about 40% by weight of sodium bisulfite whereby a ferruginous sulfite is produced without reacting said carbonyl, agitating the resulting mixture of said ferruginous sulfite, hydrocarbon and carbonyl to form a relatively heavy phase comprising said ferruginous sulfite and a relatively light phase comprising said hydrocarbon and carbonyl, and separating said phases.

3. A method for separating iron from a mixture containing same, a hydrocarbon and a carbonyl wherein said mixture comprises a hydrocarbon-rich phase obtained in the catalytic hydrogenation of oxides of carbon which comprises treating said mixture with an aqueous solution comprising between about 1% and about 40% by weight of sodium bisulfite whereby a ferruginous sulfite is produced without reacting said carbonyl, and separating said ferruginous sulfite from said hydrocarbon and carbonyl.

4. A method for separating iron from a mixture containing same, a hydrocarbon and a carbonyl wherein said mixture comprises a hydrocarbon-rich phase obtained in the catalytic hydrogenation of oxides of carbon which comprises treating said mixture with an aqueous solution comprising between about 1% and about 40% by weight of sodium bisulfite whereby a ferruginous sulfite is produced without reacting said carbonyl, agitating the resulting mixture of said ferruginous sulfite, hydrocarbon and carbonyl to form a relatively heavy phase comprising said ferruginous sulfite and a relatively light phase comprising said hydrocarbon and carbonyl, and separating said phases.

GEORGE G. LAUER.
ROBERT S. PRATT.

REFERENCES CITED

The following references are of record in the file of this patent:

UNITED STATES PATENTS

| Number | Name | Date |
|---|---|---|
| 1,704,751 | Luther | Mar. 12, 1929 |
| 2,028,998 | Schulze et al. | Jan. 28, 1936 |
| 2,278,498 | Shoemaker | Apr. 7, 1942 |
| 2,366,936 | Schulze | Jan. 9, 1945 |

FOREIGN PATENTS

| Number | Country | Date |
|---|---|---|
| 859,775 | France | Sept. 16, 1940 |